US005786583A

United States Patent [19]
Maltsev

[11] Patent Number: 5,786,583
[45] Date of Patent: Jul. 28, 1998

[54] METHOD AND APPARATUS FOR LOCATING AND DECODING MACHINE-READABLE SYMBOLS

[75] Inventor: Pavel A. Maltsev, Edmonds, Wash.

[73] Assignee: Intermec Corporation, Everett, Wash.

[21] Appl. No.: 602,624

[22] Filed: Feb. 16, 1996

[51] Int. Cl.$^6$ ................................................ G06K 7/10
[52] U.S. Cl. .................................. 235/462; 235/494
[58] Field of Search .............................. 235/464, 494, 235/462, 472, 436, 432, 486

[56] References Cited

U.S. PATENT DOCUMENTS

| | | | |
|---|---|---|---|
| 2,612,994 | 7/1952 | Woodland et al. | 209/111 |
| 4,013,893 | 3/1977 | Hertig | 250/568 |
| 4,687,942 | 8/1987 | Takagi et al. | 250/556 |
| 4,736,109 | 4/1988 | Dvorzsak | 235/464 |
| 4,874,936 | 10/1989 | Chandler et al. | 235/494 |
| 4,916,298 | 4/1990 | Raphaël | 235/463 |
| 4,998,010 | 3/1991 | Chandler et al. | 235/494 |
| 5,059,774 | 10/1991 | Kubo et al. | 235/494 |
| 5,080,456 | 1/1992 | Katz et al. | 359/214 |
| 5,153,418 | 10/1992 | Batterman | 235/494 |
| 5,189,292 | 2/1993 | Batterman et al. | 235/494 |
| 5,241,166 | 8/1993 | Chandler | 235/494 |
| 5,276,315 | 1/1994 | Surka | 235/462 |
| 5,296,693 | 3/1994 | Hughes-Hartogs | 235/494 |
| 5,324,923 | 6/1994 | Cymbalski et al. | 235/454 |
| 5,373,147 | 12/1994 | Noda | 235/462 |
| 5,376,780 | 12/1994 | Klueter | 235/462 |
| 5,513,264 | 4/1996 | Wang et al. | 235/462 |
| 5,591,956 | 1/1997 | Longacre, Jr. et al. | 235/462 |
| 5,637,849 | 6/1997 | Wang et al. | 235/494 |

FOREIGN PATENT DOCUMENTS

| | | | |
|---|---|---|---|
| 000573129 A2 | 12/1993 | European Pat. Off. | 235/494 |
| 0273184 | 11/1988 | Japan | 235/494 |
| 0177174 | 7/1989 | Japan | 235/494 |
| 0197896 | 8/1989 | Japan | 235/494 |
| 0075091 | 3/1990 | Japan | 235/494 |
| 403063780 A | 3/1991 | Japan | 235/494 |
| 404096192 A | 3/1992 | Japan | 235/494 |
| 404157587 A | 5/1992 | Japan | 235/494 |
| 404222084 A | 8/1992 | Japan | 235/494 |
| 405324943 | 12/1993 | Japan | 235/494 |
| 406195526 | 7/1994 | Japan | 235/494 |
| 406223242 | 8/1994 | Japan | 235/494 |

OTHER PUBLICATIONS

*About Aztec Code Rev. 2.0*, Welch Allyn, Inc., Data Collection Division, Skaneateles Falls, New York, Jul. 7, 1995, pp. 1–7 plus drawing.

*Uniform Symbology Specification–MaxiCode*, AIM USA Technical Specification, Pittsburgh, Pennsylvania, May 19, 1995 Draft, pp. 1–39.

Ackley, Sprague, Verification—New Insight for an Old Debate, Scan–Tech '87, Intermec Corporation, Oct. 13, 1987, pp. 1–17.

Davies, E.R., *Machine Vision: Theory, Algorithms, Practicalities*, Academic Press, London, 1989, pp. 206–215 and pp. 265–271.

(List continued on next page.)

*Primary Examiner*—Donald T. Hajec
*Assistant Examiner*—Thien Minh Le
*Attorney, Agent, or Firm*—Seed and Berry LLP

[57] ABSTRACT

A method and apparatus for locating and decoding machine-readable symbols is provided. The present invention stores an image of the symbol and locates all Jordan curves having an angular length less than $\pi$ within the image of the symbol. The present invention finds and selects all convex Jordan curves from the set of all Jordan curves found within the stored image. The present invention determines equations of a pair of tangent lines from end points of each convex Jordan curve and determines an equation of a center line for each pair of tangent lines. The present invention determines a point of intersection of the center lines, and based on the point of intersection, locates a center point of a finder pattern of the symbol. The present invention confirms that the located center point is indeed the center of the finder pattern, and thereafter decodes the symbol.

23 Claims, 11 Drawing Sheets

OTHER PUBLICATIONS

Russ, John C., *The Image Processing Handbook*, CRC Press, Boca Raton, Florida, Nov., 1994, pp. 170–189.

Gonzalez, Rafael C. and Paul Wintz, *Digital Image Processing*, Addison–Wesley Publishing Company, Reading Massachusetts, 1977, pp. 36–47.

Pavlidis, Theo, et al., "Information Encoding with Two-Dimensional Bar Codes," *Computer:* 18–27, Jun. 1992.

METHOD AND APPARATUS FOR LOCATING AND DECODING MACHINE-READABLE SYMBOLS

TECHNICAL FIELD

The present invention relates to methods and apparatus for locating and decoding machine-readable symbols or images, in particular, symbols having curved features.

BACKGROUND OF THE INVENTION

Bar code readers locate and decode typical bar codes from linear symbologies. "Linear symbologies" are symbologies where data is encoded as parallel arrangements of alternating, multiple-width bars and spaces (e.g., U.P.C., Code 39, Code 93, etc.). Linear symbologies, as well as other symbologies, encode "data characters" (i.e., human-readable characters) as "symbol characters," which are typically alternating bars and spaces.

Bar code readers typically convert symbol characters to data characters by scanning or imaging an area to produce a reflectance signal that is generally an analog signal representing the modulated light reflected from areas of high reflectance or "spaces," and absorbed by areas of low reflectance or "bars." As a result, the signal represents the pattern of bars and spaces in the symbol.

Bar code readers typically locate bar code information from other visual noise represented in the signal by locating in the signal a quiet zone. A "quiet zone" is a clear space, containing no dark marks, that precedes or follows a symbol, often next to a start or stop character. Typically, a quiet zone has a size that is about ten times greater than bars that precede or follow the quiet zone.

Newer data collection symbologies have departed from the typical linear symbologies to create stacked or area symbologies in order to increase "information density," i.e., the amount of information encoded within a given area. "Stacked symbologies," or multi-row symbologies, employ several adjacent rows of multiple-width bars and spaces (e.g., Code 49, PDF417, etc.). "Area symbologies" or two-dimensional matrix symbologies, employ arrangements of regular polygon-shaped data cells where the center-to-center distance of adjacent data cells is uniform (e.g., MaxiCode, Code One, Data Matrix, Aztec Code, etc.).

While standard locating and decode algorithms can be used for linear symbologies, and for some stacked symbologies, such algorithms are unsuitable for area symbologies. Area symbologies typically employ "finder patterns" that are unique patterns capable of being recognized by automated image recognition equipment and algorithms. For example, the MaxiCode symbology employs a two-dimensional matrix of adjacent, regular hexagons with a central bull's-eye finder pattern of black and white concentric circular rings. A related symbology, Aztec Code, employs a two-dimensional matrix of adjacent squares with a central bull's-eye finder pattern of black and white concentric square rings. Since the finder pattern is located within the middle of the matrix of data cells, and not adjacent to the quiet zone, standard locating algorithms cannot readily locate the finder pattern.

Instead, the MaxiCode symbology employs a fast fourier transform method ("FFT") or Hough transform method, both of which locate the finder pattern within the two-dimensional matrix of hexagonal data cells. The methods are sophisticated and processor intensive. For example, the FFT method converts a series of profiles taken from the symbol from the spatial domain to the frequency domain to locate the centers of the hexagonal data cells. The method then converts the frequency data back to the spatial domain to locate the outlines or outer boundaries of the hexagonal data cells. Thereafter, the method locates the central bull's-eye pattern and six sets of three data cells positioned about the bull's-eye pattern to determine the center and orientation of the symbol. More detail regarding the method can be found in the MaxiCode AIM Uniform Symbology Specification.

The above FFT and Hough transform methods require a substantial amount of memory capacity during the locating process for a given symbol. Additionally, the methods require a significant amount of processing overhead, often requiring a fast microprocessor. Additionally, fast microprocessors are typically more expensive than their slower counterparts, and therefore, readers designed to locate and decode MaxiCode symbols are expensive.

SUMMARY OF THE INVENTION

A method and apparatus for locating and decoding machine-readable symbols is provided. The present invention stores an image of the symbol and locates all Jordan curves having an angular length less than $\pi$ within the image of the symbol. The present invention finds and selects all convex Jordan curves from the set of all Jordan curves found within the stored image. The present invention determines equations of a pair of tangent lines from end points of each convex Jordan curve and determines an equation of a center line for each pair of tangent lines. The present invention determines a point of intersection of the center lines, and based on the point of intersection, locates a center point of a finder pattern of the symbol. The present invention confirms that the located center point is indeed the center of the finder pattern, and thereafter decodes the symbol.

As represented in the claims below, the present invention, in a broad sense, embodies a method of locating a predetermined pattern of convexly curved shapes and spaces between the convexly curved shapes within an image stored in a data storage device of a computer system, the computer system including a processor and a data storage device. The convexly curved shapes at least partially surround a predetermined point.

The method includes the steps of: (a) locating all curved shapes within the stored image, including the convexly curved shapes of the predetermined pattern; (b) determining a pair of tangent lines from end points of each located curved shape; (c) determining a line between each pair of tangent lines; (d) determining at least one point of intersection of the defined lines; and (e) locating the predetermined point based on the at least one point of intersection of the defined lines.

The present invention also embodies an apparatus for decoding a machine-readable symbol representing encoded information. The machine-readable symbol includes a plurality of spaced two-dimensional shapes. The symbol has a predetermined orientation pattern of convexly curved shapes and spaces between the convexly curved shapes. The convexly curved shapes at least partially surround a predetermined point of the symbol.

The apparatus includes a sensor, a receiver, a storage device, and a processor. The sensor receives light that is reflected from the machine-readable symbol and produces an output signal therefrom that represents the reflectance of the shapes and spaces comprising the symbol. The receiver receives the output signal and produces a digital signal representing an image of the shapes and spaces of the symbol. A storage device stores the digital signal.

The processor processes the digital signal and produces a signal indicative of the information encoded in the symbol. The processor: (a) locates all curved shapes within the stored digital signal; (b) determines a pair of tangent lines from endpoints of each located curved shape; (c) defines a line between each pair of tangent lines; (d) determines at least one point of intersection of the defined lines; (e) locates the predetermined point based on the at least one point of intersection of the defined lines; and (f) decodes the symbol and produces a signal indicative of the information encoded in the symbol based on the located predetermined point of the symbol.

Other features and associated advantages of the present invention will become apparent from studying the following detailed description, together with the accompanying drawings.

DETAILED DESCRIPTION OF EXEMPLARY EMBODIMENTS OF THE INVENTION

Figure 1:
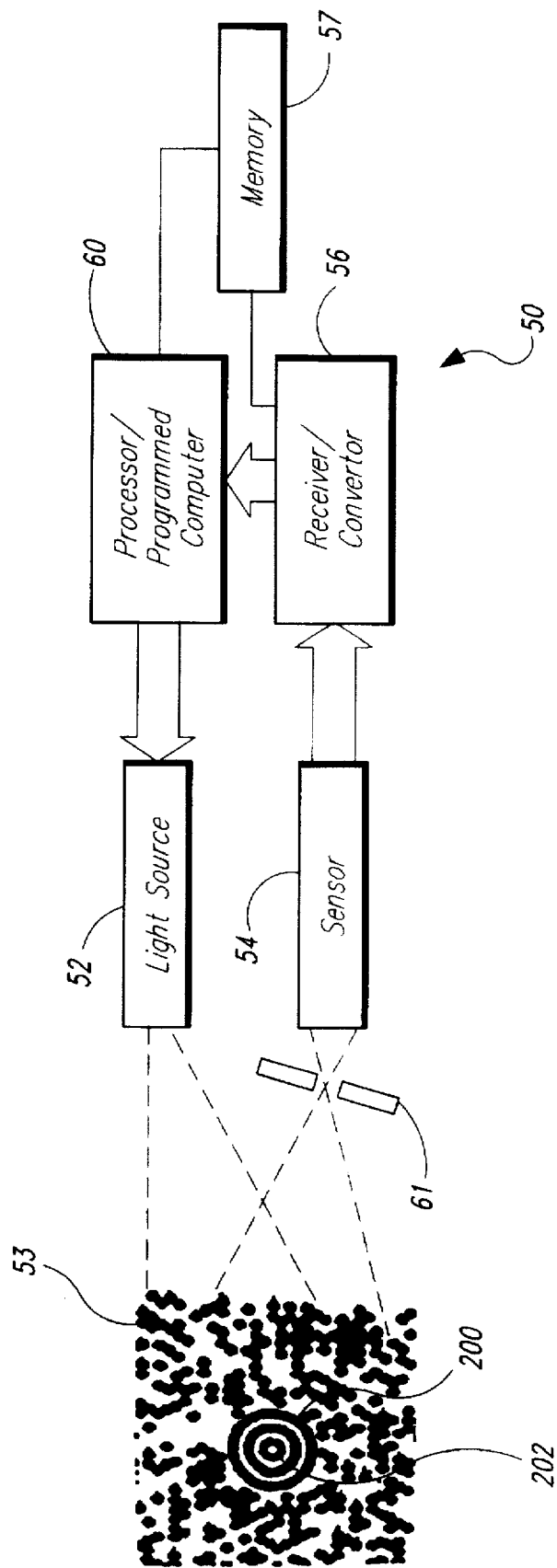
FIG. 1 is a block diagram of a preferred data collection symbology reader of the present invention with a plan view of a MaxiCode symbol.

As shown in FIG. 1, a data collection symbology reader 50 of the present invention includes a light source 52 that illuminates a data collection or other symbol, such as a MaxiCode symbol 53. As used herein, a "data collection symbol" refers to a symbol from any linear, stacked, area or other machine-readable symbology. A sensor 54 having an optical aperture 61, receives light reflected from the symbol 53 and converts the received light into an electrical signal or profile. For example, the light source 52 can be an LED, flashbulb, infrared light source, rasterizing laser, or other light-emitting element, while the sensor 54 can be a one or two dimensional CCD, semiconductor array, photodetector, vidicon, or other area imager capable of converting received light into electrical signals.

A receiver or converter 56 receives the electrical signal from the sensor 54 and converts into a signal to be processed by a programmed computer or processor 60. Typically, the sensor 54 produces an analog profile signal that represents the modulated light reflected from the elements in the symbol 53. Importantly, if the processor 60 is a digital computer, then the converter 56 converts each pixel in the image of the symbol 53 from an analog signal produced by the sensor 54 to a multi-level digital signal that numerically represents the various amplitudes of the analog signal. The converter 56 and/or processor 60 are coupled to memory 57 for storing the profile in digital form. The converter 56, memory 57 and processor 60 can be monolithically integrated.

The sensor 54 can be a charge-coupled device ("CCD") or similar area imager having a active surface such as a rectangular surface of M by N pixel elements, e.g., 582 by 752 pixel elements. As is known, each pixel element in the CCD array of the sensor typically outputs a gray level signal, i.e., an analog signal that determines the amount or intensity of light impinging upon the particular pixel element, similar to a video data signal. The converter 56 preferably converts the gray level signal into a digital signal having, for example, 16 levels of gray for use by the processor 60. The memory 57 stores the digital signals, and preferably includes both volatile and non-volatile memory (e.g., random access and electrically, erasable read-only memory). As a result the reader 50 allows an object or image within the field of view of the sensor 54 to be converted into electrical signals that are digitized and stored as a stored image in the random access portion memory 57 to be retrieved and processed by the processor 60 under a routine 100 stored in the read-only memory (as described below). After processing the stored image, the processor 60 can output the results of such processing to a peripheral apparatus or a computer (not shown).

Figure 2:
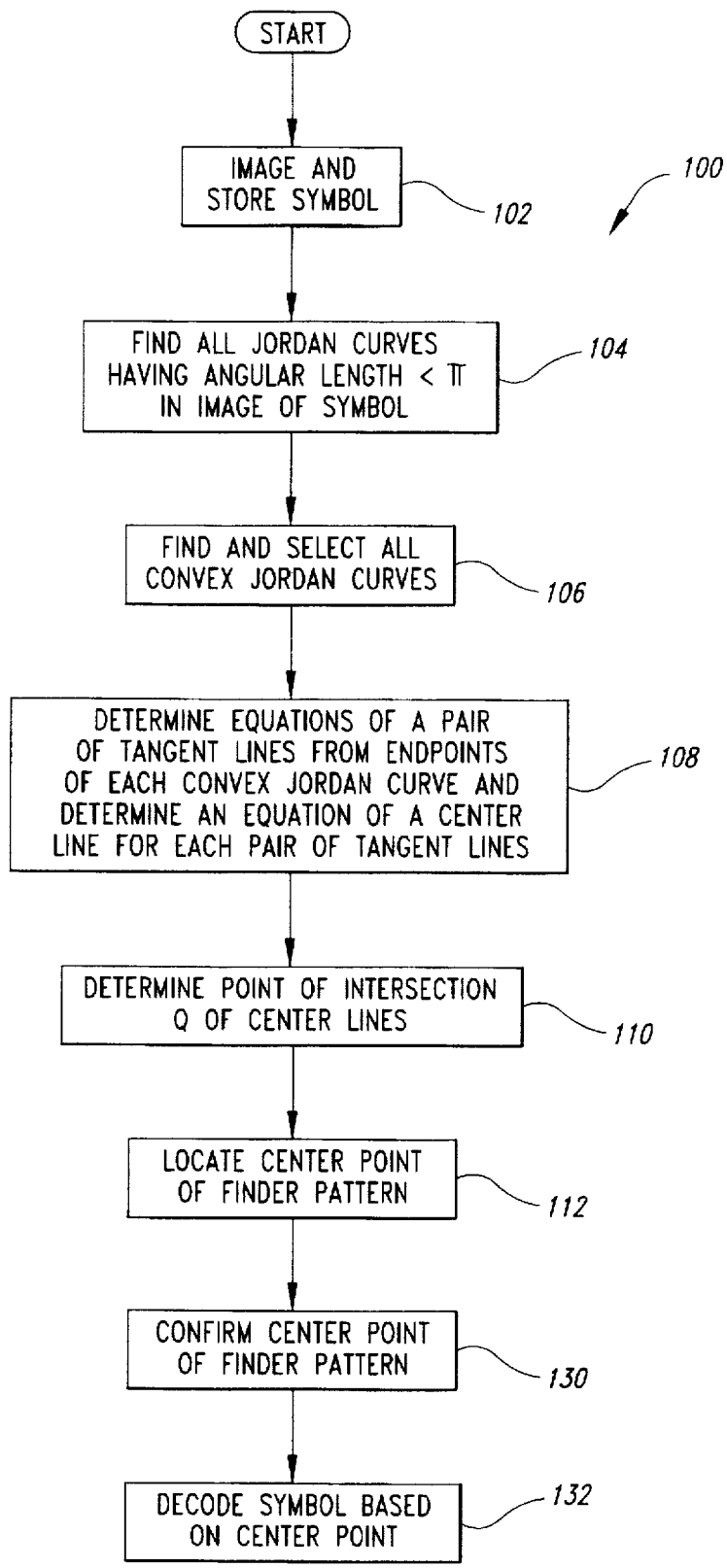
FIG. 2 is a flowchart showing an exemplary routine for locating and decoding data collection symbols, particularly the MaxiCode of FIG. 1.

Referring to FIG. 2, an exemplary routine 100 performed by the reader 50 of the present invention first locates the image of the symbol 53 within a stored image, and then decodes the symbol. As used herein, the term "stored image" generally refers to the overall image of the field of view stored in the memory 57 that has been produced by the sensor 54 and the processor 60, and which contains the symbol 53 or other symbols to be decoded. For processing efficiency, if the CCD in the sensor 54 has an array of 582 by 752 pixels, then the memory 57 includes a 582 by 752 array of memory locations addressed by the processor 60 that correspond to the array of pixels. The stored image in the memory 57 is preferably referenced by a Cartesian coordinate system so that the location of each pixel is represented by a pair of numbers indicating the horizontal and vertical position of the pixel in the stored image. For example, the first pixel in the top left corner of the stored image is assigned the Cartesian coordinates (0, 0), while the bottom right-most pixel is assigned the coordinates (752, 582). Therefore, objects within the stored image, i.e., groups of pixels, can be arithmetically located using geometric and trigonometric properties based on the coordinate system (e.g., equations of lines, circles, or other geometric or trigonometric equations used for representing planar objects, as described below). As used herein, the term "locates" generally refers to determining both the position and orientation of the image of an object within the stored image.

The routine 100 begins in step 102 where the reader scans or stores an image of the symbol 53. For example, the reader 50 can be a hand-held product and include a trigger switch (not shown) coupled to the processor 60 that causes the light source 52 to illuminate the symbol 53, and allow the sensor 54, converter 56 and processor 60 to store an image of the symbol in the memory 57 upon actuation of the switch. The specific means and method for storing an image of a symbol by the reader 50 are conventional and will be understood by those skilled in the relevant art without need for further description herein.

In step 104, the processor 60 begins to locate the symbol 53 within the stored image. As shown in FIG. 1, the MaxiCode symbol 53 includes a center finder pattern 200, which consists of three concentric rings surrounding a central white spot 202. The ultimate goal of the present invention is to determine a central point within the white spot 202, and thereby determine the center point for the entire symbol 53. By determining the center point for the symbol 53, the reader 50 can more readily locate each of the data cells within the symbol, and thereby rapidly decode the symbol. The terms "point" and "pixel" are generally used interchangeably herein.

The present invention locates the finder pattern 200, and ultimately a center point within the white spot 202 by locating images of complex curves within the image stored by the reader 50. The present invention relies on properties of convexity and has much less computational complexity than previous methods. Mathematically, the present invention first assumes that a function p=f(t) in general is a complex function with a real variable t, which is defined and continuous within a closed interval [a, b]. Furthermore, the present invention recognizes that the complex function p is made up of elements defined by X and Y axis Cartesian coordinates, which can be represented as follows:

$$p=(x,y) \in X \times Y, \text{ where } X=[1,\ldots,k], \text{ and } Y=[1,\ldots,n], \quad (1)$$

and where k and n are horizontal and vertical sizes of the image stored by the reader 50. The complex function p defines a continuous curve L, where $$p=f(t), \, t \in X \times Y \quad (2).$$

Any concentric ring within the stored image can be defined by one or more Jordan curves J. The curve J is a Jordan curve if along the length of the curve, the curve does not intersect itself so that two points have the same value, or in other words, can be represented mathematically by:

$$\forall t_1, t_2 \in [a,b] \, t_1 \neq t_2 \text{ then } f(t_1) \neq f(t_2)) \quad (3)$$

After identifying all Jordan curves J within the image stored by the reader 50, the present invention selects all convex Jordan curves, ignoring all non-convex curves. As can be seen by the center finder pattern 200 for the symbol 53, the finder pattern is essentially constructed of multiple convex curves, and therefore, by locating such curves, the reader 50 can more rapidly identify the finder pattern within the stored image.

Figure 3:
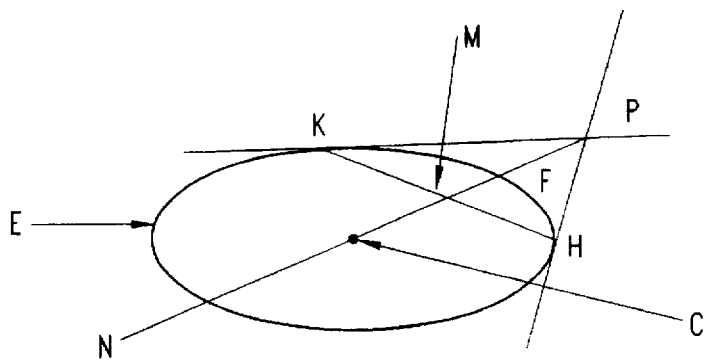
FIG. 3 is a schematic diagram of an ellipse having tangent and chord lines to demonstrate the chord-tangent theorem.

To identify those Jordan curves J which are convex, the present invention relies in part on the chord-tangent theorem for ellipses. Referring to FIG. 3, for an ellipse E, any two tangents can be drawn at points K and H on the ellipse, where the tangents intersect at a point P. The chord-tangent theorem then states that the tangent points K and H form a chord within the ellipse e, where the chord KH has a midpoint M. Projecting a line through the points P and M, a center C of the ellipse E lies on the line PN.

The line PM intersects the ellipse E at a point F between the points H and K. A concavity orientation is defined as follows. The curve KFH is a Jordan curve, where the tangent points K and H intersect at a point P outside of the ellipse E. The convexivity orientation of the curve KFH is defined by a vector PM where the point M lies at the middle of the chord KH. In other words, the vector PM points inward toward the center point C of the ellipse E.

Recognizing that if the present invention locates the image of one or more Jordan curves that form edges of one or more concentric rings in the finder pattern 200 of the symbol 53, then the concavity orientations of these curves will indicate an orientation or direction toward a center point of the ring, and ultimately toward the center spot 202. The present invention does not need to calculate the coordinates and concavity orientation of all Jordan curves, but only Jordan curves having an angular length less than or equal to $\pi$. If the present invention locates at least two convexivity orientation vectors for two Jordan curves along a concentric ring, then the orientation vectors will cross at a point that is approximately the center of the concentric ring. The MaxiCode finder pattern 200 employs three dark rings which provide a total of six edges for the concentric rings (two edges per ring). As a result, the present invention can locate at least 2 Jordan curves having angular length less than $\pi$ for the finder pattern 200.

Returning to FIG. 2, the processor 60 in step 104 first begins to locate the center point of the white spot 202 of the finder pattern 200 by analyzing the stored image to locate a set of edge points E representing black-to-white transitions or vice versa. The processor 60 analyzes multiple sampling paths through the stored image, such as a horizontal path through the image, a vertical path, 90° from the horizontal path, and paths 26°, 45° and 71° from the horizontal path. Other known sampling strategies for a stored image can also be employed.

Thereafter, the processor 60 locates in the set E all Jordan curves having an angular length less than $\pi$ within the stored image of the symbol 53. In step 104, the processor 60 employs a searching method to find edges of concentric rings within the stored image by sampling predetermined lines of pixel values to identify a set E of edge points where the brightness changes from "white" to "black" or vice versa. The searching method assumes that any edge point e which is an element of the set of edge points E, can be an edge point of a concentric ring of the finder pattern 200 for the symbol 53. To prove that a given edge point e is in fact an edge point for one of the concentric rings in the finder pattern 200, the searching method outlines edges D, which includes the set of edge points E, and then select from the edges D those edges having angular length less than π.

The searching method assumes that the edge of a concentric ring cannot be shorter than a number N of pixels, and that its curve has a limited gradient of displacement. These assumptions help avoid later unnecessary calculations by the processor 60. As mentioned above, the stored image has a resolution generally limited by the number of pixels within the CCD imager or other similar imaging device. As a result, curves are not continuous, but instead have sharp changes between an integer number of pixel elements (e.g., at times appearing as a stair-step pattern when viewed at a smaller scale).

To locate each curve in the stored image, the processor 60 in step 104 determines if each detected edge point e in the set of edge points e is indeed a point of an edge (rather than simply a single data cell), and evaluates a "dominant direction" of the edge point e. Thereafter, the processor 60 in step 104 calculates top-down and left-right density differences of the edge to approximately characterize the spatial orientation of the edge (i.e., whether it is oriented horizontally or vertically) so that an appropriate template can be applied to an area adjacent to each edge point to determine position coordinates for a possible edge. In other words, in step 104, the processor 60 initially filters edge points that are not edge points of curves and determines coordinates and orientation of the curve based on the applied template, as described below.

Figure 4:
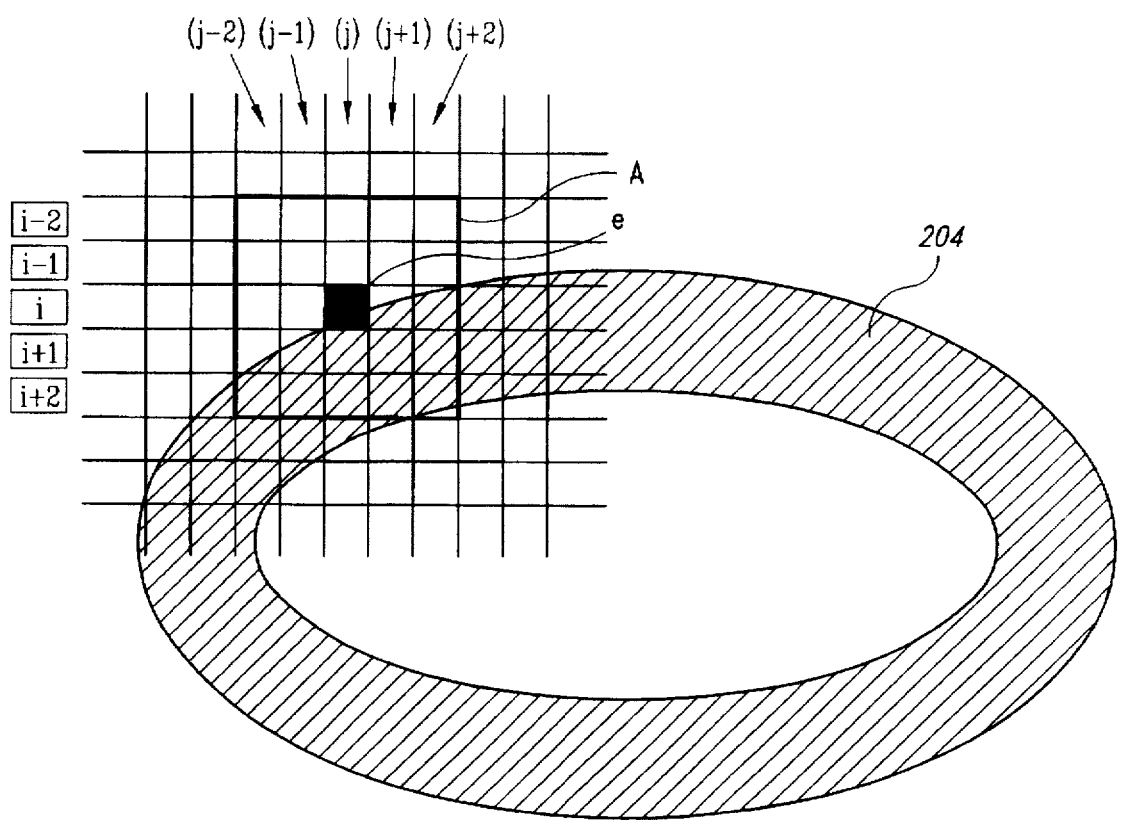
FIG. 4 is an enlarged view of a ring from the center finder pattern from the MaxiCode symbol of FIG. 1, having an exemplary grid of image elements or pixels overlaid thereon.

Referring to FIG. 4, the processor 60 in step 104 analyzes neighboring pixels within an environmental area A that surround a given edge point e. The edge point e is a point on an outer edge of a ring 204 of the finder pattern 200 indicating a change in intensity from white to black. The edge point e has coordinates (i, j), whereas the environmental area A is a square area that spans coordinates (i−2, j−2) to (i+2, j+2), resulting in a 5×5 pixel area. The processor 60 in step 104, or previous steps, calculates a local intensity threshold for the area A surrounding the edge point e to determine a threshold intensity value that defines or separates black pixels from white pixels. To determine a top-bottom density difference, the processor 60 calculates a number of pixels within the top two rows of pixels, and the bottom two rows of pixels, that have an intensity or brightness greater than the previously calculated local intensity threshold. The pixel coordinates for the top and bottom parts of the area A of the edge point e are as follows:

$$\text{Top Portion} = \{\{(i-2),(j-2)\},\{(i-2),(j-1)\}, \quad (4)$$
$$\{(i-2),(j)\},\{(i-2),(j+1)\},$$
$$\{(i-2),(j+2)\},\{(i-1),(j-2)\},$$
$$\{(i-1),(j-1)\},\{(i-1),(j)\},$$
$$\{(i-1),(j+1)\},\{(i-1),(j+2)\}\},$$
$$\text{Bottom Portion} = \{\{(i+2),(j-2)\},\{(i+2),(j-1)\},$$
$$\{(i+2),(j)\},\{(i+2),(j+1)\},$$
$$\{(i+2),(j+2)\},\{(i+1),(j-2)\},$$
$$\{(i+1),(j-1)\},\{(i+1),(j)\},$$
$$\{(i+1),(j+1)\},\{(i+1),(j+2)\}\}.$$

Likewise, left-to-right pixel density differences are calculated based on intensity values greater than the calculated threshold for the left two columns and right two columns in the area A, as represented by the following equation:

$$\text{Left Portion} = \{\{(i-2),(j-2)\},\{(i-1),(j-2)\}, \quad (5)$$
$$\{(i),(j-2)\},\{(i+1),(j-2)\},$$
$$\{(i+2),(j-2)\},\{(i-2),(j-1)\},$$
$$\{(i-1),(j-1)\},\{(i),(j-1)\},$$
$$\{(i+1),(j-1)\},\{(i+2),(j-1)\}\},$$
$$\text{Right Portion} = \{\{(i-2),(j+2)\},\{(i-1),(j+2)\},$$
$$\{(i),(j+2)\},\{(i+1),(j+2)\},$$
$$\{(i+2),(j+2)\},\{(i-2),(j+1)\},$$
$$\{(i-1),(j+1)\},\{(i),(j+1)\},$$
$$\{(i+1),(j+1)\},\{(i+2),(j+1)\}\}.$$

The Top, Bottom, Left and Right Portions each represent a sum of the number of pixels within each Portion that are greater than the local intensity threshold. If each white pixel is assigned a value of 1, while each black pixel is assigned a value of 0, then the Top Portion would have a value of 10, as shown in FIG. 4. The Bottom Portion would in this example have a value of approximately 1 (corresponding to the single pixel that is more white than black (i+1),(j−2)). The top-bottom density difference is equal to the absolute value of the top portion minus the bottom portion (10−1=9). Likewise, the left-right density difference is equal to the absolute value of the left portion minus the right portion (approximately 7−4=3).

If the following inequality:

$$abs(\text{TopPortion}-\text{BottomPortion}) >= abs(\text{LeftPortion}-\text{RightPortion}) \quad (6)$$

is true, then the horizontal direction is dominant; otherwise, the vertical direction is dominant for the area A. For the example shown in FIG. 4, since the top-bottom portions are greater than the left-right portions, the horizontal direction is dominant under equation (6) above. Based on the dominant direction, the processor 60 in step 104 applies an appropriate searching template (which for the example of FIG. 4, is the vertical template) to identify and store the positions of edge pixels for an identified curve.

Figure 5A:
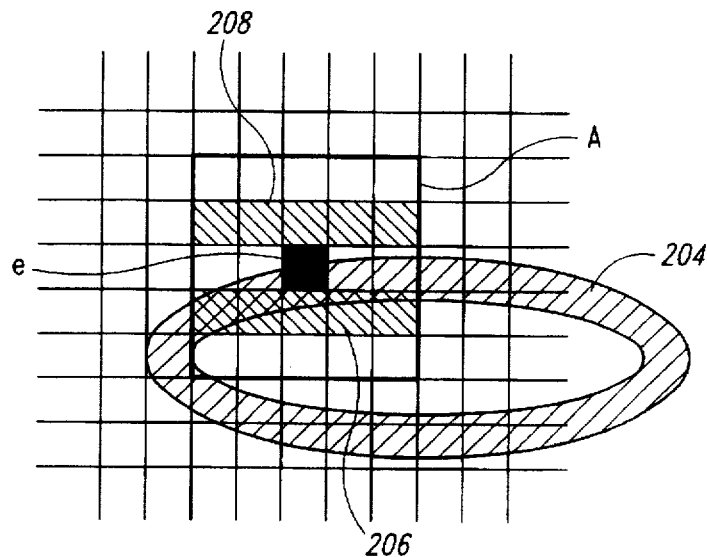
FIG. 5A shows the ring of the finder pattern of FIG. 4 having a vertical searching template positioned thereon.
Figure 5B:
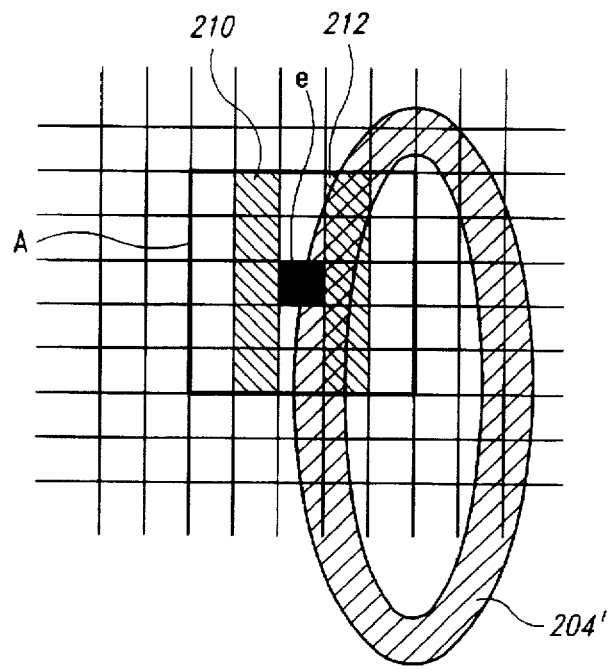
FIG. 5B shows the ring of the finder pattern of FIG. 4 having a horizontal searching template positioned thereon.

Referring to FIG. 5A, if the processor 60 determines in step 104 that the dominant direction is vertical, then the processor applies a horizontal searching template consisting of an immediately adjacent upper and lower rows of pixels 208 and 206, respectively. Similarly, as shown in FIG. 5B, if the dominant direction is horizontal, the processor 60 applies a vertical searching template consisting of the immediately adjacent left and right vertical columns of five pixels 210 and 212, respectively. By employing such horizontal and vertical templates, the processor 60 in step 104 can identify the positions of pixels which define Jordan curves having a maximum angular length less than or equal to π.

Figure 6:
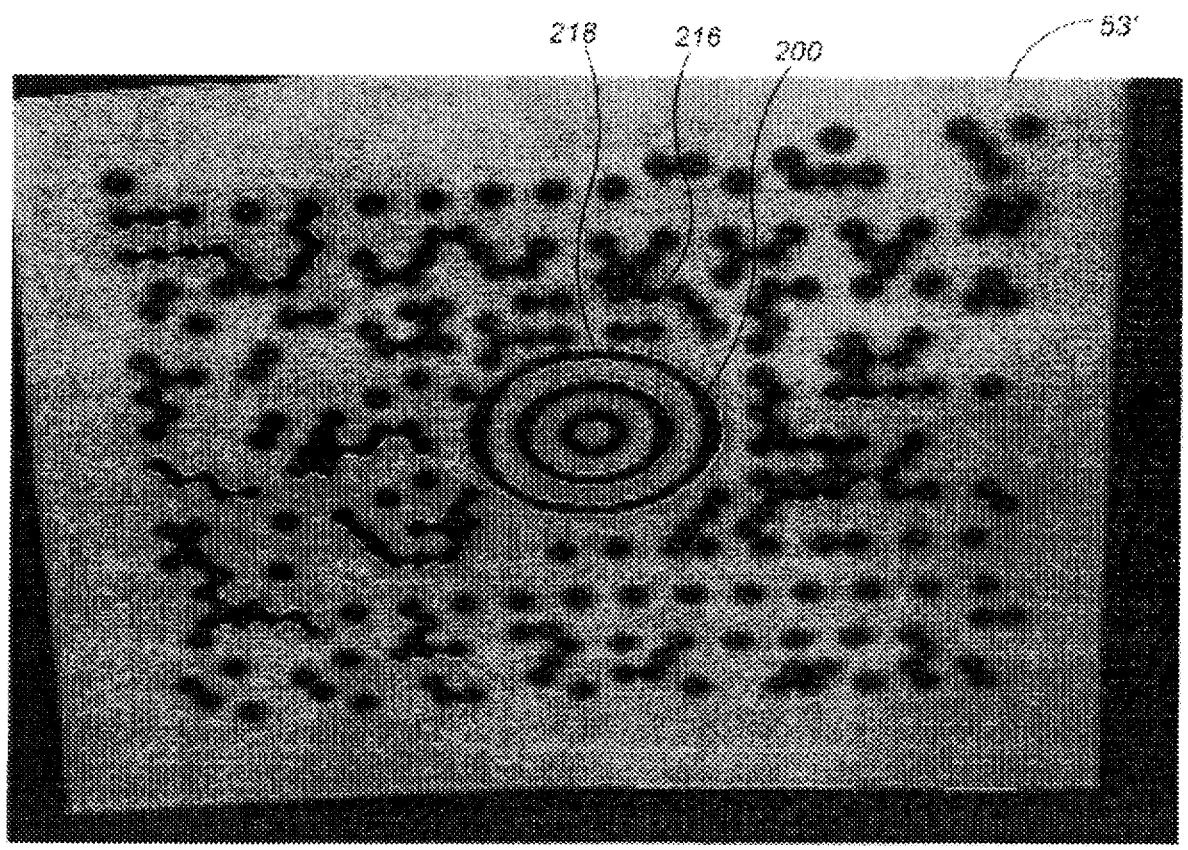
FIG. 6 is an enlarged image of a MaxiCode symbol showing Jordan curves located therein by the routine of FIG. 2.

To summarize, in step 104, the processor 60 identifies a set of edge points e, analyzes a neighboring area around each point e and for each identified curve, determines a dominant direction for each edge point e in the set E, employs an appropriate horizontal or vertical matching template depending upon the dominant direction for a given point e, and then stores coordinates of a set of Jordan curves J for each edge point in the set of edge points E. As shown in FIG. 6, a symbol 53', similar to the symbol 53 of FIG. 1, shows all Jordan curves J identified by the processor 60 in step 104 as highlighted curves. The set of Jordan curves J includes a highlighted curve 216 which does not form part of the center finder pattern 200, and a curve 218, which forms an upper outer edge of a first ring of the finder pattern.

Figure 7:
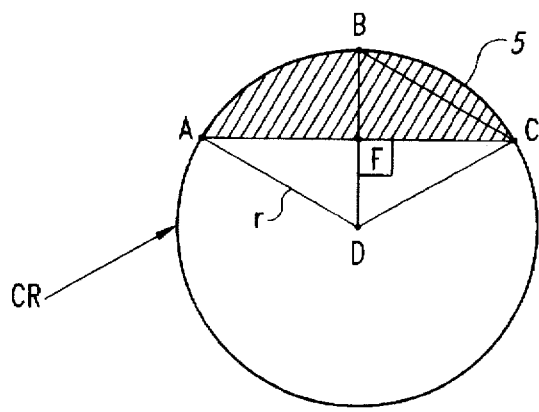
FIG. 7 is a circle used to show how the routine of FIG. 2 determines which Jordan curves in FIG. 6 are convex.

Referring back to FIG. 2, the processor 60 in step 106 selects all convex Jordan curves from the set of Jordan curves identified in step 104. To select those Jordan curves which are convex, the present invention employs known properties of circles and ellipses. Referring to FIG. 7, a circle CR is shown having a radius r. The circle CR includes a Jordan curve ABC which is defined by points A, B and C. A chord AC has a midpoint F, while a center of the circle is defined by a point D. If the processor 60 knows the lengths of lines a=FC and h=FB, and the radius r=DC, then the processor also recognizes that the radius r is equal to the following:

$$r = (h*h + a*a)/(z*h) \qquad (7)$$

As a result, an area S defined by the chord AC and the Jordan curve ABC is defined by the following equation:

$$S = r^2 * \text{arc sin } (a/r) - (r-h)*a \qquad (8)$$

Rarely, however, will the rings of the finder pattern 200 be exactly circular. Instead, the rings will more likely be elliptical. As a result, assuming that the circle CR were instead an ellipse, then the routine 100 employs maximum and minimum eccentricity coefficients $k_{max}$ and $k_{min}$, respectively, which define maximum and minimum acceptable eccentricity for the finder pattern 200. If the finder pattern 200 is too distorted (i.e., has too distorted an eccentricity), then even if the routine 100 locates the central point of the finder pattern, the surrounding data cells will be too distorted for the reader 50 to decode. Therefore, in step 106, the processor 60 determines if the computed area $S_{ellipse}$, which will be the area of an ellipse, is within a maximum and minimum value which deviates from an ideal area $S_{circle}$ for a circle, based on the following equation:

$$S_{circle} * k_{min} <= S_{ellipse} <= S_{circle} * k_{max} \qquad (9)$$

Exemplary values for $k_{max}$ and $k_{min}$ are 1.3 and 0.7, respectively.

The present invention is not only interested in locating convex Jordan curves within the set of Jordan curves defined in step 104, but also locating those Jordan curves which have a convexivity similar to a convexivity of a circle or a well behaved ellipse. The processor 60 in step 106 therefore selects those Jordan curves having a convexivity similar to a convexivity of a well behaved ellipse by comparing the area under a particular Jordan curve being analyzed to the value of an ideal area under a circular curve. The actual Jordan curve is defined by a chord connecting end points of the curve, and has a height defined as the height from a midpoint of the chord to the curve. The circular curve has a similar chord and height, where the chord and height have lengths equal to the chord and height of the Jordan curve. In other words, for a chord length and height of a given Jordan curve, the present invention compares the actual measured area to an ideal area formed by a circle having an equal chord length and height (i.e., an area S for the curve of ABC and the chord AC, where the chord AC and the height BF are equal to the chord and height of the Jordan curve being analyzed).

If the measured area under the Jordan curve $S_{ellipse}$ is less than the ideal area under the circular curve $S_{circle}$ multiplied by the maximum eccentricity coefficient $k_{max}$, and is more than the ideal area under the circular curve $S_{circle}$ multiplied by the minimum eccentricity coefficient $K_{min}$, then the particular Jordan curve being analyzed is an acceptably convex curve under equation (9). The processor 60 determines the area under a curve based on the known Stieltjes integral, which is reprinted below:

$$I\_s = \int_{(AD)} f(t)d\mu(t), \qquad (10)$$

where μ(t) is an integer value defined on a chord AD (corresponding, e.g., to a finite number of pixels).

Figure 8A:
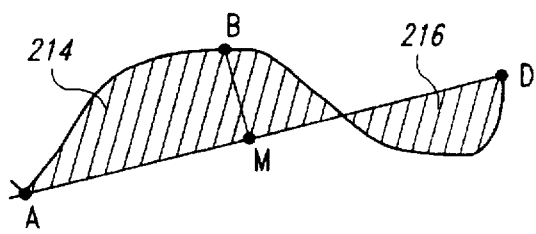
FIG. 8A shows an exemplary curve having a shape that is unsimilar to a desired convexity of ellipses.
Figure 8B:
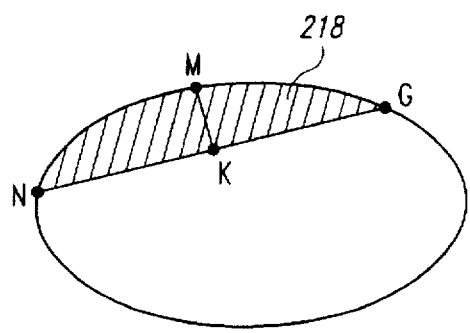
FIG. 8B shows an exemplary preferred convex curve that forms part of an ellipse.

Referring to FIGS. 8A and 8B, the curves of FIGS. 8A and 8B have substantially identical chord lengths ABD and NMG, and substantially identical heights BM and MK, respectively. The curve ABD of FIG. 8A, however, deviates substantially from a more ideal curve of an ellipse, such as curve NMG of FIG. 8B. Equation (10) is applied along a chord ABD (FIG. 8A) and a chord NMG (FIG. 8B) to determine the areas under these curves. In general, a Jordan curve is "convex" if a chord extending between end points of the curve cross the curve at only the two end points (as shown in FIG. 8B). The equations (9) and (10) generally determine which Jordan curves are not convex, where a chord extending between end points of the curve intersect the curve at three or more locations (as shown in FIG. 8A).

Equation (10) produces a positive area 214 and a negative area 216 for the chord ABD, while the chord NMG produces a single larger positive area 218. The negative area 216 subtracts from the positive area 214 for the curve ABD, resulting in a small overall area under the curve ABD. The processor 60 in step 106 computes the area under the curve ABD, computes the area under a circular curve having a chord length and height equal to that of the curve ABD, compares the total area calculated under the curve ABD to ideal minimum and maximum values under equation (9) for the ideal curve, and determines that the resulting area lies outside of the limits of equation (9). As a result, the processor 60 determines that the curve ABD of FIG. 8A is not an acceptable convex Jordan curve, and therefore ignores such a curve in later steps.

The curve NMG, however, has the single positive area 218 which falls within the limits of equation (9), and therefore, the processor determines that this curve is an acceptably convex Jordan curve. As a result, in step 106, the processor 60 applies equation (10) to determine an area under a Jordan curve, and compares this area to an ideal circular area having an identical chord length and height under equation (9) to determine if the curve is acceptably convex and thus not be filtered from later processing.

Figure 9A:
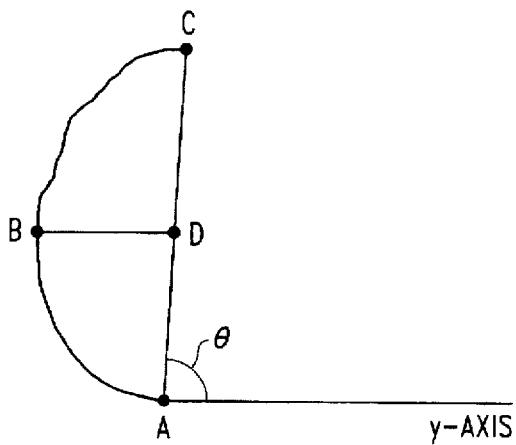
FIG. 9A is an exemplary convex curve located by the routine of FIG. 2 under the present invention.
Figure 9B:
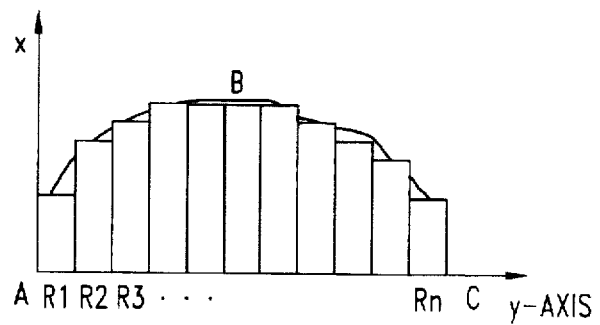
FIG. 9B shows the curve of FIG. 9A and several rectangular regions formed therein whose area approximates the area under the curve.

To help reduce processing overhead, and therefore speed up operation of step 106, the processor 60 can perform several time saving operations. For example, referring to FIG. 9A, an exemplary Jordan curve ABC is shown oriented at an angle Θ from the Y axis, where the Y axis is a Y axis of the stored image, two-dimensional CCD sensor 54, or other pre-established Y axis for the reader 50. To speed computation of the area under the curve ABC, the curve ABC can be rotated about the Y axis so that the chord AC lies along, or is parallel to, the Y axis, as shown in FIG. 9B.

Additionally, equation (10) above can be simplified by simply calculating the area of multiple rectangles underneath the curve ABC, and then adding the areas of those rectangles, based on the following equation:

$$I\_l = \sum_{i=0}^{n} Ri, \qquad (11)$$

where n is the number of rectangular areas and the area of each rectangle is an area Ri. To reduce the number of comparisons, the processor 60 simply employs the following equation:

$$abs[(I\_l - S_{circle})/S_{circle}] \leq err \qquad (12),$$

where I_1 is the area under the curve ABC estimated under equation (11), $S_{circle}$ is the ideal area under a circular region having identical length chord AC and height BD, and where abs corresponds to the absolute value of the quantity in brackets. The error value err is a tolerable error value deviation from the ideal error value for a circular area under a circular curve. Equation (12) requires one less comparison than equation (9) above.

Figure 10:
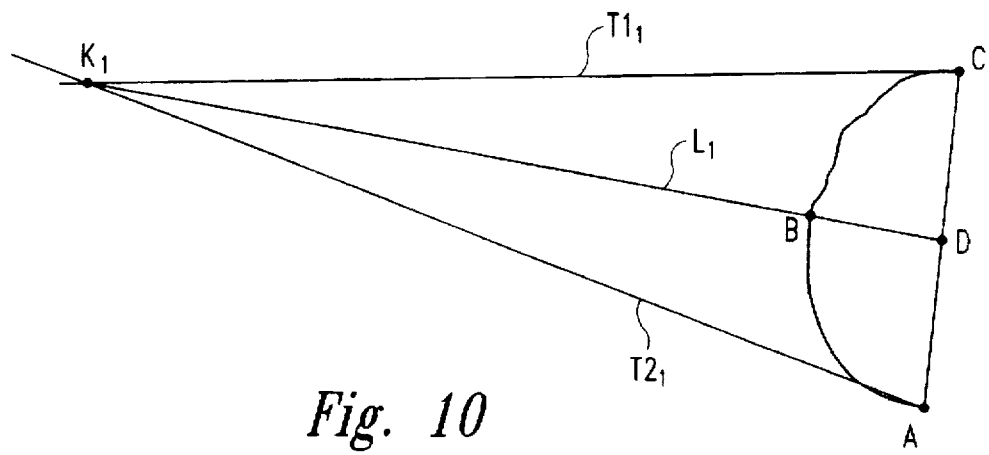
FIG. 10 shows the curve of FIG. 9A with two tangent lines drawn therefrom to define a center line.

Referring back to FIG. 2, after identifying and determining the locations of all convex Jordan curves in step 106, the processor 60 in step 108 computes linear equations of a pair of tangent lines from the end points of each curve. Thereafter, based on an intersection point of the pair of tangent lines, the processor 60 in step 108 determines an equation of a center line that intersects the intersection point and a midpoint of the chord for the given convex Jordan curve. For example, referring to FIG. 10, the processor 60 in step 108 constructs a first tangent line $T1_1$ from a point C, and a second tangent line $T2_1$ from a tangent point A, where both of the points C and A are endpoints of a convex Jordan curve ABC. The processor 60 determines the following equations for the first and second tangent lines $T1_1$ and $T2_1$:

$$y=k_1*x+b_1, \text{ and } y=k_2*x+b_2 \quad (14),$$

where $k_1$ and $k_2$ correspond to the slopes of the lines $T1_1$ and $T2_1$, while $b_1$ and $b_2$ are the Y-axis intercept points of these lines, all respectively. The first and second tangent lines $T1_1$ and $T2_1$ intersect at a point $K_1$. The processor 60 determines the equation of a center line $L_1$ through the intersection point $K_1$ and a midpoint D of the chord AC based on the following equation:

$$y=k_c*x+b_c \quad (15),$$

where $k_c$ and $b_c$ correspond to the slope and Y-axis intercept, respectively, for the line $L_1$. The processor 60 determines the linear equations of tangent lines and center lines for all convex Jordan curves determined in step 106, based on equations (14) and (15) above.

Figure 11:
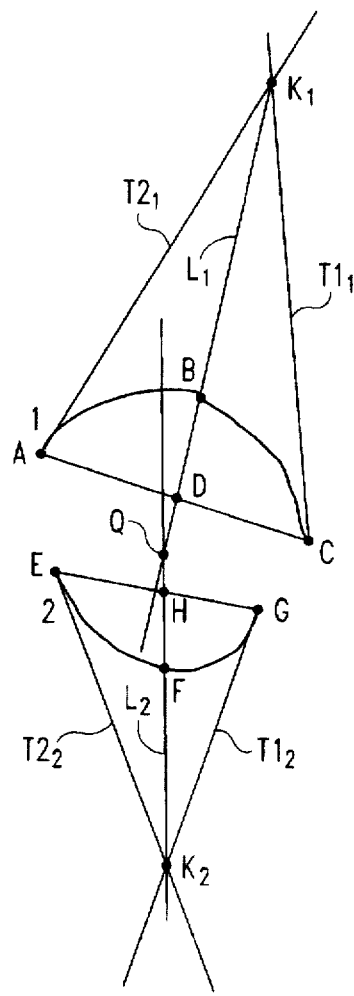
FIG. 11 shows the curve of FIG. 10 and another curve, each curve having an associated pair of tangent lines and a center line, the center lines intersecting at a central point.

Referring back to FIG. 2, the processor 60 in step 110 determines one or more points of intersection of the center lines L determined in step 108. For example, referring to FIG. 11, the curve ABC (from FIG. 10) having the center line $L_1$ is shown intersecting at a point Q with a center line $L_2$ for a curve EFG. The center line $L_2$ for the curve EFG was constructed in step 108 by the processor 60 based on first and second tangent lines $T1_2$ and $T2_2$. By selecting only convex curves having an angular length less than $\pi$ in step 104, the first and second tangent lines will always intersect at the convex side of the curve, i.e., at a point opposite to the chord extending between the end points of the curve. Otherwise, if Jordan curves having an angular length greater than $\pi$ were employed, the first and second tangent lines would diverge at the convex side of the curve.

As explained above with respect to the chord-tangent theorem, the center of the ellipses defined by the curves ABC and EFG lie along the center lines $L_1$ and $L_2$, respectively. Since it is likely that most of the convex Jordan curves identified by the processor 60 are edges of the finder pattern 200, and since two or more curves of the finder pattern have approximately the same center point, an intersection point of center lines from these curves will intersect at the approximate center point. Therefore, the processor 60 assumes that the intersection point Q lies within the finding pattern 200 for the symbol 53, and in the ideal situation, will be the actual center point for the finder pattern. However, due to differing types of distortions, such as optical distortions, printing defects, round off errors, etc., the intersection point Q, will not be at the actual center point for the finder pattern 200. Moreover, with multiple convex Jordan curves producing multiple center lines, multiple intersection points Q will likely be formed, all of which will be within the finder pattern 200, but none of which are likely the exact center point for the white spot 202 of the finder pattern.

Figure 12:
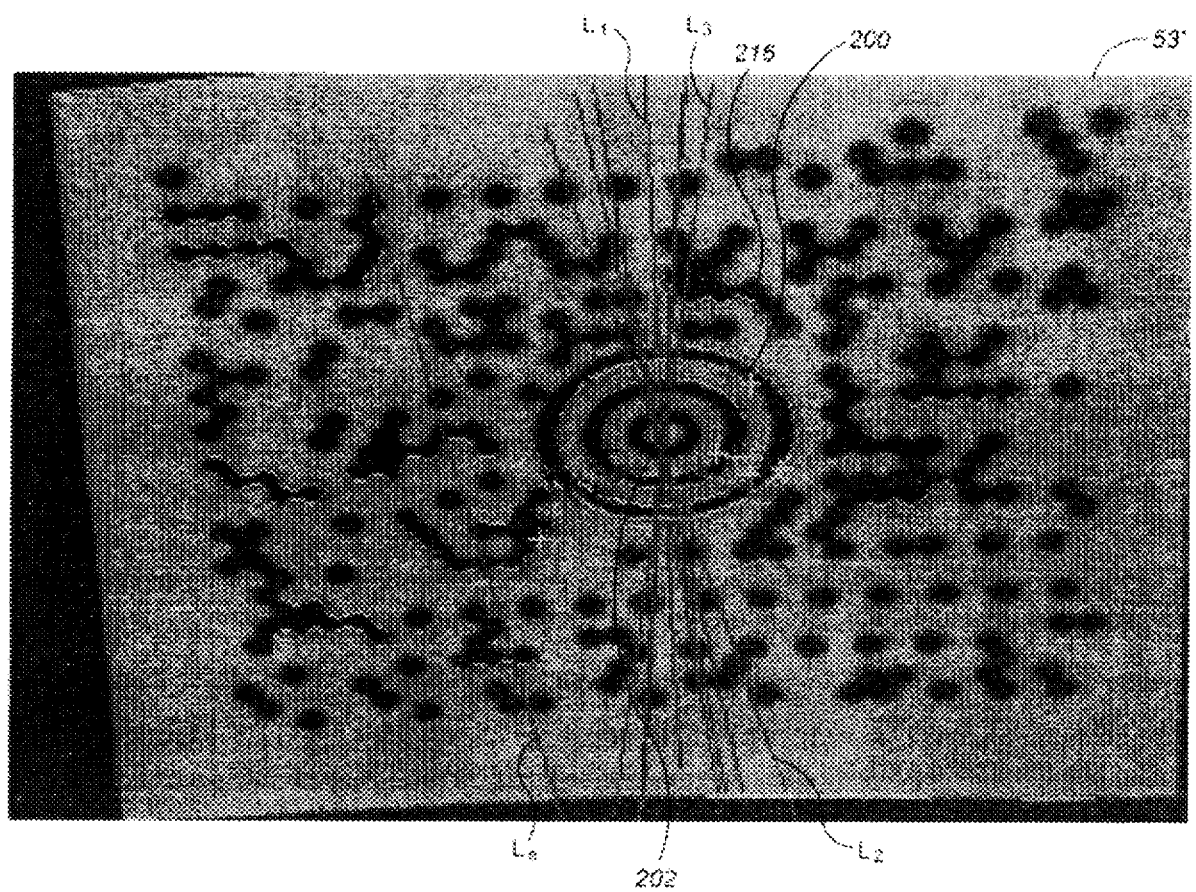
FIG. 12 is an image of the MaxiCode symbol of FIG. 6 showing several center lines extending from several convex Jordan curves.

For example, as shown in FIG. 12, multiple center lines $L_1$, $L_2$, $L_3$ and $L_e$ are shown as produced by the processor 60 in step 108. (Tangent points are shown as small "plus" signs at opposite ends of highlighted convex curves.) As shown in FIG. 12, the center lines intersect at one or more points which lie outside of the center spot 202. The center line $L_e$, which is formed by a curve that is not part of the finder pattern 200, does not intersect another center line, and therefore, is ignored during later processing under the routine 200.

In step 110, the processor 60 ignores any intersection point Q formed between two center lines having an angle therebetween of less than 10° or greater than 90°, however, the upper angle can be extended up to 170°. By providing a large angle between intersecting center lines, the present invention provides a greater probability that the intersection point Q will be close to the actual center point within the white spot 202 of the finder pattern 200.

To select a point that is most likely within the white spot 202 of the finder pattern 200, the processor 16 step 110 examines all intersection points Q of intersecting center lines to establish a cluster of proximate intersection points. The processor 60 examines all of the intersection points Q, and ignores those which are furthest from the largest cluster of such points. The largest cluster of intersection points Q corresponds to intersection points within or close to the finder pattern 200. Thereafter, the processor 60 averages the positions of the cluster of intersection points Q to determine coordinates of an averaged intersection point Q' that is most likely to be within the finder pattern 200.

Referring back to FIG. 2, in step 112, the processor 60 locates the actual center point within the white spot 202 of the finder pattern 200 by performing a center point finding subroutine. The center point finding subroutine essentially performs two steps. In the first step, the processor 60 performs N number of iterations of a gradual movement toward the center white spot 202 of the finder pattern 200. Second, the processor 60 employs a convexivity property of circles and ellipses to locate the exact center point of the center white spot 202.

Figure 13:
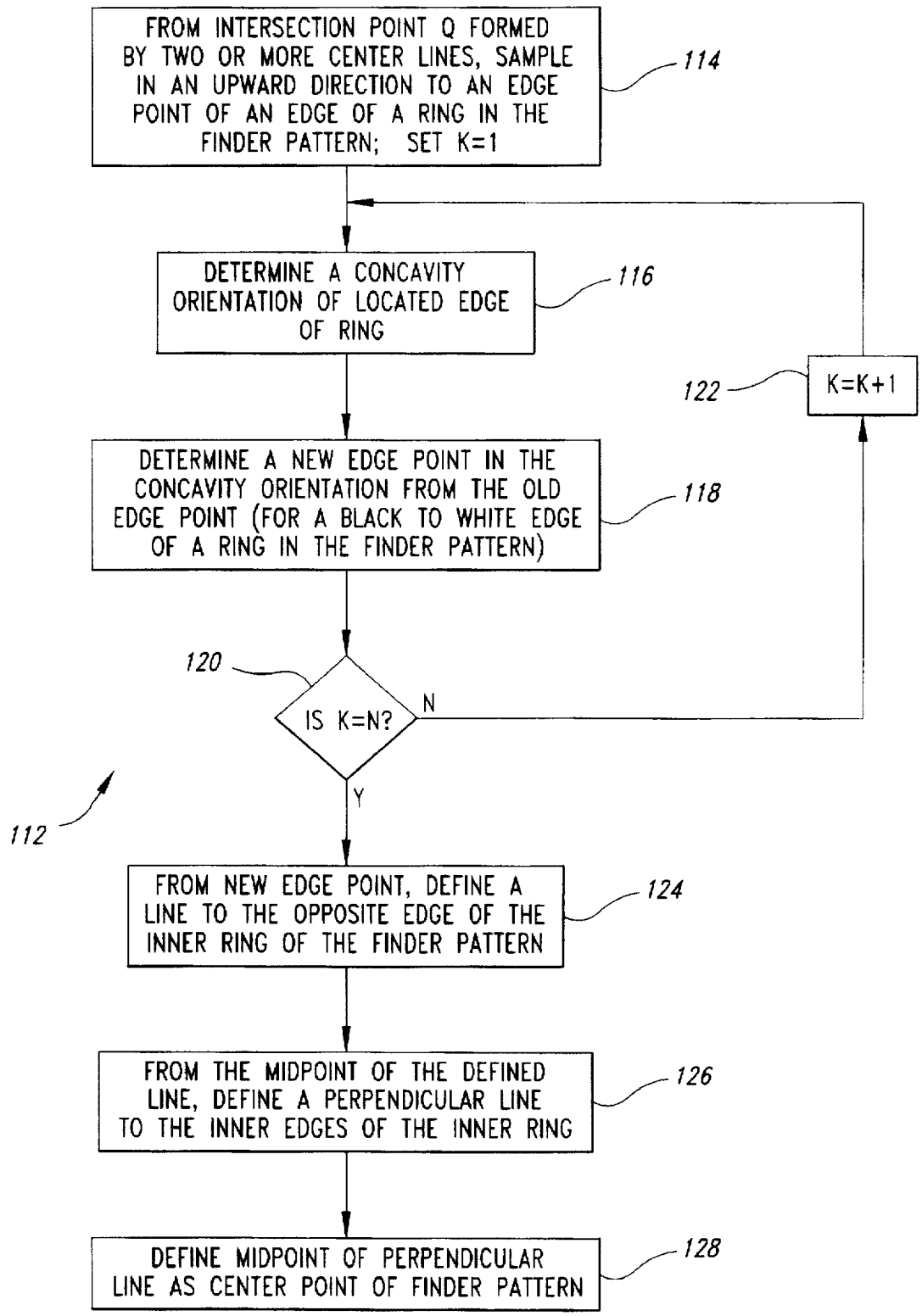
FIG. 13 is a subroutine performed by the routine of FIG. 2 for defining the center point of the center finder pattern of the MaxiCode symbol of FIG. 1.

Referring to FIG. 13, the center point finding subroutine 112 begins in step 114 by sampling pixels directly upward or opposite from an intersection point Q determined in step 110 to locate an edge point of an inner edge of a ring in the finder pattern 200 that is the closest to the average intersection point Q'. In step 114, the processor 60 also sets a variable K equal to 1.

Figure 14A:
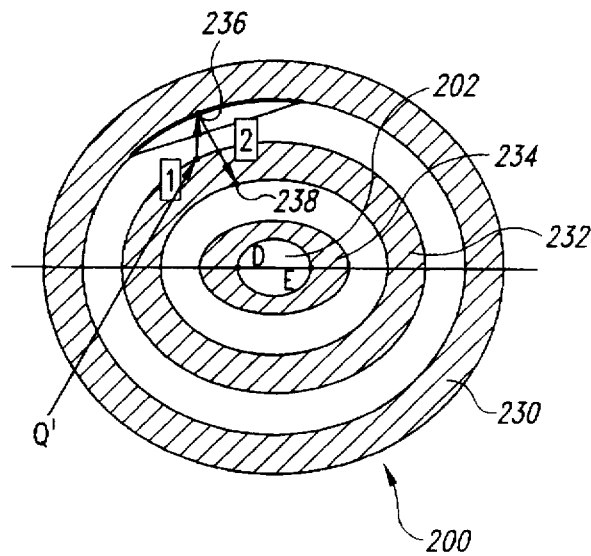
FIG. 14A is an enlarged finder pattern of the MaxiCode symbol of FIG. 1 showing location of the center point under the first few steps of the subroutine of FIG. 13.

In step 116, the processor 60 determines a convexivity orientation of the located edge of the ring of the finder pattern located in step 114. For example, as shown in FIG. 14A, the average intersection point Q' is located between an outer ring 230 and a middle ring 232 of the finder pattern 200. In step 114, the processor 60 samples an upward direction toward an inner edge of the outer ring 230 to determine an edge point 236. In step 116, the processor 60 determines a convexivity orientation of the located inner edge of the outer ring 230, and then in step 118, determines a new edge point 238 at an inner edge of the middle ring 232 by following the convexivity orientation from the edge point 236 to the new edge point 238. The edge located by the processor 60 in step 118 can be an edge defined by a transition from black to white pixels, as shown in FIG. 14A.

Figure 14B:
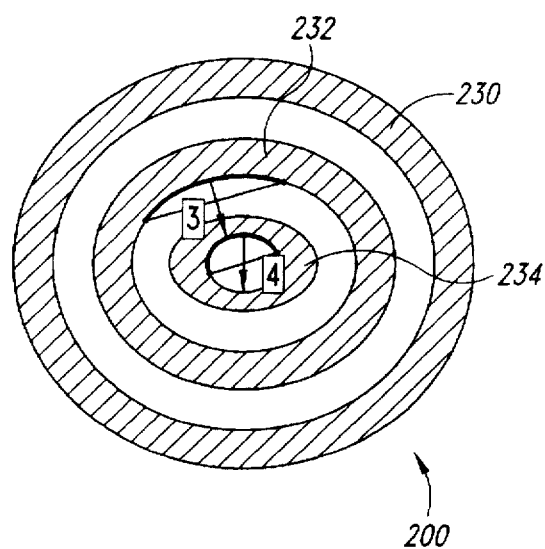
FIG. 14B is an enlarged finder pattern of the MaxiCode symbol of FIG. 1 showing, location of the center point under the several additional steps of the subroutine of FIG. 13.

In step 120, the processor 60 determines whether the variable K is equal to an integer value such as 7. If it is not, then in step 122, the processor 60 increments the variable K by one and returns to step 116. The processor 60 performs steps 116 and 118 for six additional iterations as the processor locates the center white spot 202 within the finder pattern 200. As shown in FIG. 14B, two additional iterations of the steps 116 and 118 are shown as the processor 60 moves from the middle ring 232 to an inner ring 234, and then to the white spot 202. Thereafter, following additional iterations of steps 116 and 118, the processor 60 defines concavity orientations which point upward, and then back downward, as the processor oscillates within the center white spot 202 for additional iterations of the steps 116 and 118. By performing multiple iterations of the steps 116 and 118, such as by seven iterations, the processor 60 ensures that after a final iteration of the steps, the processor 60 will have located the center white spot 202 within the finder pattern 200.

Figure 15:
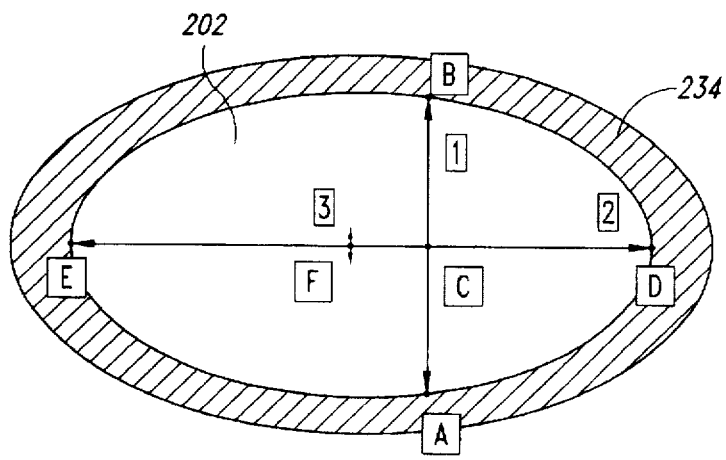
FIG. 15 shows an enlarged view of a central ring of the finder pattern of FIGS. 14A and 14B to demonstrate the last steps performed under the subroutine of FIG. 13.

After seven iterations of the steps 116 and 118, the processor 60 in step 120 determines that K is equal to 7. Thereafter, in step 124, the processor 60 defines a line to the opposite edge of the inner ring 234 from the most newly established edge point determined in step 118. Referring to FIG. 15, assuming that the most recently determined edge point in step 118 is a point A, then in step 124, the processor 60 defines a line upward within the center white spot 202 to a point B.

In step 126, the processor 60 defines a midpoint C along the line AB. Based on the midpoint C, the processor 60 defines a line perpendicular to the line AB, through the midpoint C, such as the line DE shown in FIG. 15. Thereafter, in step 128, the processor 60 defines a midpoint F along the line DE as the center point for the white spot 202 and therefore the central point for the finder pattern 200.

Figure 16:
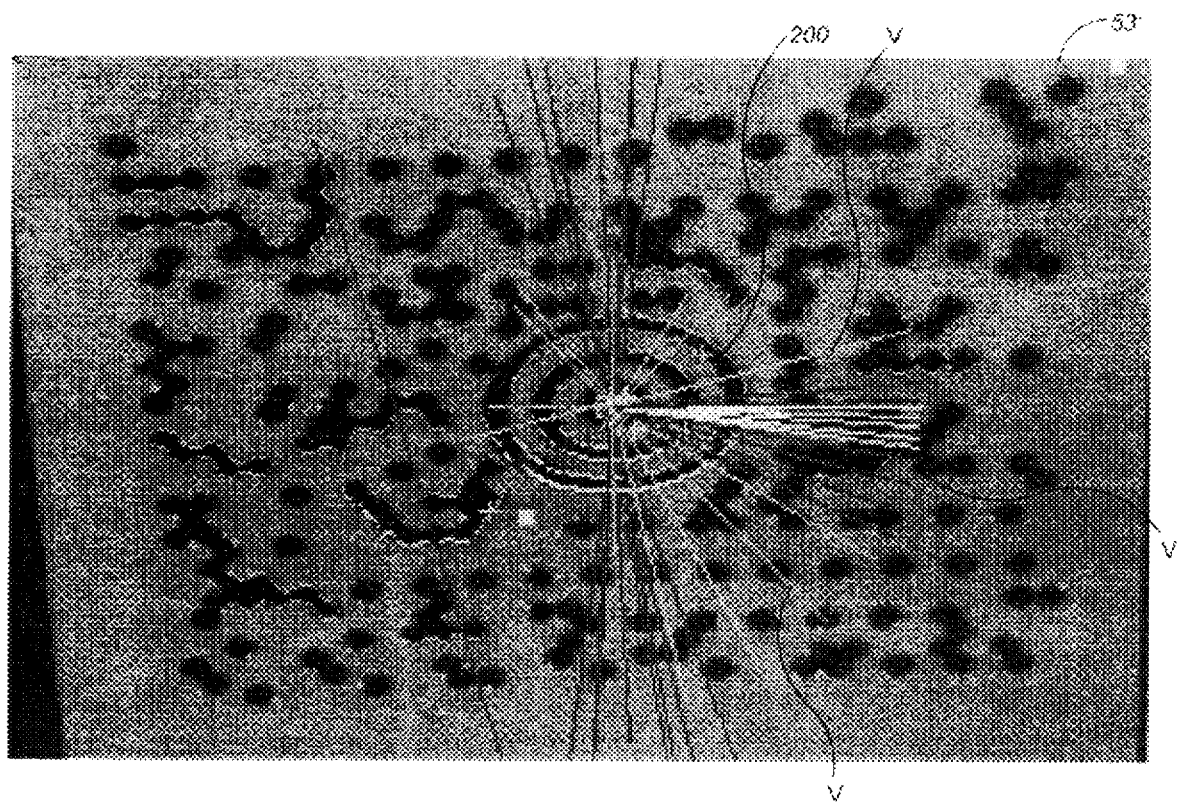
FIG. 16 is the image of the MaxiCode symbol of FIG. 6 showing the center point of the finder pattern located under the routine of FIG. 2.

FIG. 16 shows multiple orientation vectors, shown as light lines extending from the center of the symbol 53', as determined in steps 116 and 118 (some of the orientation vectors identified by the symbol "V"). FIG. 16 also shows the center point as determined under the center point finding subroutine 112 at the center of intersecting horizontal and vertical lines for central "cross hairs."

Referring back to FIG. 2, the processor 60 in step 130 confirms that the located center point is in fact the center of the finder pattern 200. The processor 60 extends the line DE outward through the entire finder pattern 200 (as shown in FIG. 14A). The processor 60 measures the distances in opposite directions from the center point F to the inner and outer edges of the inner ring 234, middle ring 232 and outer ring 230 to determine if these distances are equal. If the center point F were indeed the exact center of the finder pattern 200, then the distances measured on a line extending from the point F would be substantially equal for each of the rings 234, 232 and 230. After locating the exact center point of the finder pattern 200, and thus the symbol 53, the processor 60 in step 132 readily decodes the symbol using known methods.

Although specific embodiments of, and examples for, the present invention have been described for purposes of illustration, various modifications may be made without departing from the spirit and scope of the invention, as will be known by those skilled in the relevant art. For example, while the present invention has been generally described above as locating the center finder pattern of a MaxiCode symbol, the present invention can be applied to machine vision systems that require locating circles, ellipses, rings or other similar curvilinear patterns. The present invention can be readily used in computer systems with robotic arms for locating annular, circular or elliptical objects, such as nuts in various environments, e.g., in an automated assembly environment.

The teachings provided here and of the present invention may be applied to other machine vision systems, not necessarily machine-readable symbol readers. These and other changes may be made to the invention in light of the above detailed description. Accordingly, the invention is not limited by the disclosure, but instead its scope is to be determined entirely from the following claims.

I claim:

1. A method of locating and decoding a machine-readable symbol representing encoded information, the symbol including a plurality of selectively spaced two-dimensional geometric shapes, the shapes and spaces between the shapes having at least a first width in at least one dimension, the symbol having a predetermined orientation pattern of convexly curved shapes and spaces between the convexly curved shapes, the convexly curved shapes at least partially surrounding a predetermined point of the symbol, the method comprising the steps of:

storing an image of the symbol;

locating all curved shapes within the stored image of the symbol, including the convexly curved shapes of the predetermined orientation pattern;

determining a pair of tangent lines from endpoints of each located curved shape;

defining a line between each pair of tangent lines;

determining at least one point of intersection of the defined lines;

locating the predetermined point of the symbol based on the at least one point of intersection of the defined lines; and decoding the information encoded in the symbol based on the located predetermined point of the symbol.

2. The method of claim 1 wherein the step of storing an image of the symbol stores an image of a MaxiCode symbol and wherein the convexly curved shapes are a plurality of concentric rings surrounding the predetermined point.

3. The method of claim 1 wherein the step of locating all curved shapes within the stored image of the symbol includes the steps of:

locating an edge point of a curved shape;

analyzing an area proximate the edge point;

determining a dominant direction of the located curved shape based on the analyzed area; and applying a vertical searching template for locating a position of the curved shape if the dominant direction is horizontal, and applying a horizontal searching template for locating a position of the curved shape if the dominant direction is vertical.

4. The method of claim 1 wherein the step of locating all curved shapes in the symbol locates all curved edges between curved shapes and adjacent spaces, and locates curved edges having an angular length less than $\pi$.

5. The method of claim 1 wherein the step of locating all curved shapes in the symbol locates all convex Jordan curves.

6. The method of claim 1 wherein the step of locating all curved shapes within the stored image of the symbol includes the steps of:

determining an area under each of the located curved shapes;

comparing each determined area to maximum and minimum values corresponding to maximum and minimum error deviations from an ideal area under a circular curve having a same chord length and height substantially equal to a length of a chord extending between endpoints of the curve and a height of the curve, respectively; and ignoring any curve whose determined area is greater than the maximum value or less than the minimum value.

7. The method of claim 1 wherein the step of locating all curved shapes within the stored image of the symbol includes the steps of:

determining an area under a located curved shape by determining an area of a plurality of rectangular regions under the located curved shape and summing the areas of the plurality of rectangular regions;

comparing the determined area to a selected value; and ignoring the curve if the determined area bears a predetermined relationship to the selected value.

8. The method of claim 1 wherein the step of locating all curved shapes within the stored image of the symbol includes the steps of:

determining an area under each of the located curved shapes;

comparing each determined area to a selected value; and ignoring any curve whose determined area bears a predetermined relationship to the selected value.

9. The method of claim 1 wherein the step of determining a pair of tangent lines includes the step of determining an intersection point of each pair of tangent lines, and wherein the step of defining a line between each pair of tangent lines defines a centerline by determining a midpoint of a chord formed between the endpoints of each located curved shape, and defining the centerline as a line extending through the intersection point of each pair of tangent lines and the respective midpoint.

10. The method of claim 1 wherein the step of determining at least one point of intersection of the defined lines ignores any point of intersection between two defined lines where an angle of intersection between the defined lines is less than about 10 degrees and greater than about 90 degrees.

11. The method of claim 1 wherein the predetermined point is a central point of the predetermined orientation pattern, and wherein the step of locating the predetermined point of the symbol includes the steps of:

from the at least one point of intersection of the defined lines, analyzing the stored image to locate an edge of one of the convexly curved shapes of the predetermined orientation pattern;

determining an orientation of a concavity of the one located convexly curved shape;

analyzing the stored image along the determined orientation of concavity to locate another edge of the convexly curved shapes;

repeating the steps of determining an orientation and analyzing the stored image along the determined orientation for a preselected number of iterations;

defining an interior line extending away from the another edge;

determining a midpoint of the interior line and defining a line perpendicular to the interior line from the midpoint; and defining the central point as a midpoint of the perpendicular line.

12. The method of claim 1 wherein the predetermined point is a central point of the predetermined orientation pattern, and wherein the method further comprises the steps of:

measuring distances to the convexly curved shapes in opposite directions from the central point; and confirming that the central point is an approximate center point of the symbol if the measured distances in opposite directions are approximately similar.

13. The method of claim 1 wherein the predetermined point is an approximately central point of the symbol, and wherein the method further comprises the step of confirming that the predetermined point is a center point of the symbol.

14. In a computer system having a processor and a data storage device, a computer implemented method of locating a predetermined pattern of convexly curved shapes and spaces between the convexly curved shapes within an image stored in the data storage device, the convexly curved shapes at least partially surrounding a preselected point, the method comprising the steps of:

locating all curved shapes within the stored image, including the convexly curved shapes of the predetermined pattern;

determining a pair of tangent lines from endpoints of each located curved shape;

defining a line between each pair of tangent lines;

determining at least one point of intersection of the defined lines; and locating the preselected point based on the at least one point of intersection of the defined lines.

15. The method of claim 14 wherein the step of locating all curved shapes in the symbol locates all edges between curved shapes and adjacent spaces, and locates curved shapes having an angular length less than π.

16. The method of claim 14 wherein the step of locating all curved shapes within the stored image includes the steps of:

determining an area under each of the located curved shapes;

comparing each determined area to a selected value; and ignoring any curve whose determined area bears a predetermined relationship to the selected value.

17. The method of claim 14 wherein the step of determining a pair of tangent lines includes the step of determining an intersection point of each pair of tangent lines, and wherein the step of defining a line between each pair of tangent lines defines a centerline by determining a midpoint of a chord formed between the endpoints of each located curved shape, and defining the centerline as a line extending through the intersection point of each pair of tangent lines and the respective midpoint.

18. The method of claim 14 wherein the preselected point is an approximately central point of the predetermined pattern, and wherein the method further comprises the step of confirming that the preselected point is a center point of the predetermined pattern.

19. An apparatus for decoding a machine-readable symbol representing encoded information, the machine-readable symbol including a plurality of spaced two-dimensional shapes, the symbol having a predetermined orientation pattern of convexly curved shapes and spaces between the convexly curved shapes, the convexly curved shapes at least partially surrounding a predetermined point of the symbol, the apparatus comprising:

a sensor that receives light that is reflected from the symbol and produces an output signal therefrom that represents the reflectance of the shapes and spaces comprising the symbol;

a receiver that receives the output signal and produces a digital signal representing an image of the shapes and spaces of the symbol;

a storage device for storing the digital signal; and a processor for processing the digital signal and producing a signal indicative of the information encoded in the symbol, the processor (a) locating all curved shapes within the stored digital signal, (b) determining a pair of tangent lines from endpoints of each located curved shape, (c) defining a line between each pair of tangent lines, (d) determining at least one point of intersection of the defined lines, (e) locating the predetermined point based on the at least one point of intersection of the defined lines, and (f) decoding the symbol and producing a signal indicative of the information encoded in the symbol based on the located predetermined point of the symbol.

20. The apparatus of claim 19 wherein the processor locates all edges between curved shapes and adjacent spaces, and locates curved shapes having an angular length less than $\pi$.

21. The apparatus of claim 19 wherein the processor locates the curved shapes by (i) determining an area under each of the located curved shapes, (ii) comparing each determined area to a selected value, and (iii) ignoring any curve whose determined area bears a predetermined relationship to the selected value.

22. The apparatus of claim 19 wherein the processor determines a pair of tangent lines by determining an intersection point of each pair of tangent lines, and defines a line between each pair of tangent lines by defining a centerline based on a midpoint of a chord formed between the endpoints of each located curved shape and the intersection point of each pair of tangent lines.

23. The apparatus of claim 19 wherein the predetermined point is an approximately central point of the symbol, and wherein the processor confirms that the located predetermined point is a center point of the symbol.

* * * * *